United States Patent [19]

Walsh

[11] 3,731,291

[45] May 1, 1973

[54] INTEGRATED POSITIVE PRESSURE AND SELF-PURGE SYSTEM

[75] Inventor: Robert J. Walsh, Thousand Oaks, Calif.

[73] Assignee: Burroughs Corporation, Detroit, Mich.

[22] Filed: Apr. 12, 1971

[21] Appl. No.: 133,213

[52] U.S. Cl. ..............................340/174.1 E, 55/468

[51] Int. Cl. ..............................................G11b 23/04

[58] Field of Search ..........................137/544; 233/2; 55/468, 175; 340/174.1 E

[56] References Cited

UNITED STATES PATENTS

| | | | |
|---|---|---|---|
| 3,631,423 | 12/1971 | Groom | 179/100.2 P |
| 3,624,624 | 11/1971 | Johnson | 340/174.1 E |
| 3,573,771 | 4/1971 | Cockrell, Jr. | 179/100.2 P |
| 3,303,485 | 2/1967 | Lee | 340/174.1 E |
| 3,319,236 | 5/1967 | Hajen | 340/174.1 E |
| 3,179,945 | 4/1965 | Shapiro | 340/174.1 E |
| 3,084,492 | 4/1968 | Dorszk et al. | 55/468 |
| 3,257,777 | 6/1966 | Weisse | 55/468 |
| 3,143,187 | 8/1964 | Stefan | 55/468 |

*Primary Examiner*—Vincent P. Canney
*Attorney*—Christie, Parker & Hale

[57] ABSTRACT

A magnetic memory disk file system operates with a rotating memory disk within a closed housing. The air in the housing is preferably maintained at a slight positive pressure by addition of filtered air. Generation or release of particles within the housing during rotation of the disk may interfere with the magnetic memory system and are, therefore, removed by a self-purging loop taking air from the housing through a filter and returning it to the housing. The pressurization and self-purging systems are combined by way of an ejector pump for vectorially adding gas streams, thereby in one embodiment providing a positive pressure throughout the interior of the housing due solely to the "pumping" action of the rotating disk without a requirement for auxiliary pressurization. In another embodiment, a source of pressurizing gas induces self-purging within the housing whether or not the disk is rotating.

22 Claims, 6 Drawing Figures

Patented May 1, 1973 3,731,291

2 Sheets-Sheet 1

INVENTOR.
ROBERT J. WALSH

BY

Christie, Parker & Hale
ATTORNEYS

INTEGRATED POSITIVE PRESSURE AND SELF-PURGE SYSTEM

BACKGROUND

Magnetic memory disk files are an important item of peripheral equipment commonly used with modern day digital computers or the like. These magnetic memory systems serve as data storage devices and operate at high speeds for extremely long periods of time without significant maintenance or other attention. A typical magnetic memory system has a housing within which one or more flat disks is rotated at high speed. A magnetic recording material is deposited on one or both faces of the disk and recording transducers or heads are arranged adjacent each face of the disk for writing and reading data on the magnetic memory material. To achieve long life in the disks and heads, they are maintained out of contact during operation; however, to achieve a high density of data recording the heads are arranged as close to the face of the disk as possible.

There have, therefore, been developed recording heads that operate on a fluid film bearing generated by the thin film of air carried by the rapidly moving disk spinning past the face of the recording head. Such flying or floating heads, as they have come to be known, typically operate within 100 microinches or less of the rapidly moving disk surface.

With such extremely close spacing, any particles that enter the housing may enter the close space between the head and disk and upset the delicate equilibrium of the floating head. Such an encounter may disturb the equilibrium to the point that the head touches or crashes against a surface of the disk, thereby damaging or destroying either the head or disk, or both, at least to the point that they are not useful for further data recording or reading in that region without repair.

In order to minimize the amount of particulate matter that enters the housing for the rotating disk, blowers have been provided feeding air through filters and thence into the housing so that the entire housing is at a very slight positive pressure. The clean air so introduced is freed of particulate material by passage through the filter, and the inherent leakage of the housing is entirely in an outward direction so that no particles can enter from other regions. In such a system, as the disk rotates at high speed there is a relatively higher pressure near its periphery and a relatively lower pressure near its hub, and the positive pressure introduced into the housing must be sufficient to overcome the tendency to lower the pressure near the hub which otherwise might be less than atmospheric.

Despite the introduction of filtered air particles may still be encountered within the housing. These particles may have adhered to the disk, the housing, the magnetic recording transducers or other components within the housing at the time of assembly and be dislodged during operation. Other particles may be generated due to wear or aging during life of the rotating disk memory system. These particles that are generated or released within the housing tend to accumulate and after many hundreds of hours of operation may interfere with the flying or floating of the recording heads.

There have, therefore, been introduced self-purging systems that extract air from the housing, pass it through a filter, and return it to the housing. In one such system described and illustrated in U.S. Pat. application Ser. No. 832,930, now U.S. Pat. No. 3,631,423 entitled "Self-Purging Disk System," filed June 13, 1969, by Robert G. Groom, and assigned to Burroughs Corporation, assignee of this application, the inherent "pumping" action of the rotating disk is employed for obtaining the required pressure gradients for moving air through the filter. When a disk rapidly rotates within a housing, a somewhat higher pressure may be generated near its periphery and a relatively lower pressure near its hub. By providing a suitable entrance adjacent the periphery, the slightly pressurized gas can be extracted and passed to a filter. The outlet of the filter is then discharged in the relatively lower pressure near the hub of the disk so that a continuous self-purging flow is established as the disk rotates.

An improved self-purging rotating disk system is described and illustrated in U.S. Pat. application Ser. No. 92,649, entitled "Self-Purging Disk System Having Air Flow Guide Means," filed Nov. 25, 1970, by A. F. Stansell, and assigned to Burroughs Corporation, assignee of this application. The teachings of these aforementioned copending patent applications are hereby incorporated by reference for full force and effect as if set forth in full herein.

BRIEF SUMMARY OF THE INVENTION

In practice of this invention according to a presently preferred embodiment, there is provided a combination for pressurizing and cleaning gas in a housing comprising a rotatable member in the housing and means for rotating it, and means for extracting a portion of gas from the housing near the periphery of the rotatable member and for returning the portion of gas to the housing at a lower pressure region. A filter and an ejector pump are connected between the means for extracting and the means for returning for vectorially adding gas from within the housing and gas from without the housing and for removing particles from both. In one embodiment, the jet inlet of the ejector pump is connected to the means for extracting and the suction inlet of the ejector pump is in fluid communication with the ambient air whereby the flow of self-purging gas induces a positive pressure within the housing. In another embodiment, means for supplying gas under pressure is connected to the jet inlet of the ejector pump and the suction inlet is connected to the means for extracting so that circulation is obtained within the housing whether or not the disk is rotating.

DRAWINGS

These and other features and advantages of the present invention will be appreciated as the same becomes better understood by reference to the following detailed description of presently preferred embodiments when considered in connection with the accompanying drawings wherein.

Throughout the drawings like numerals refer to like parts.

DESCRIPTION

Figure 1:
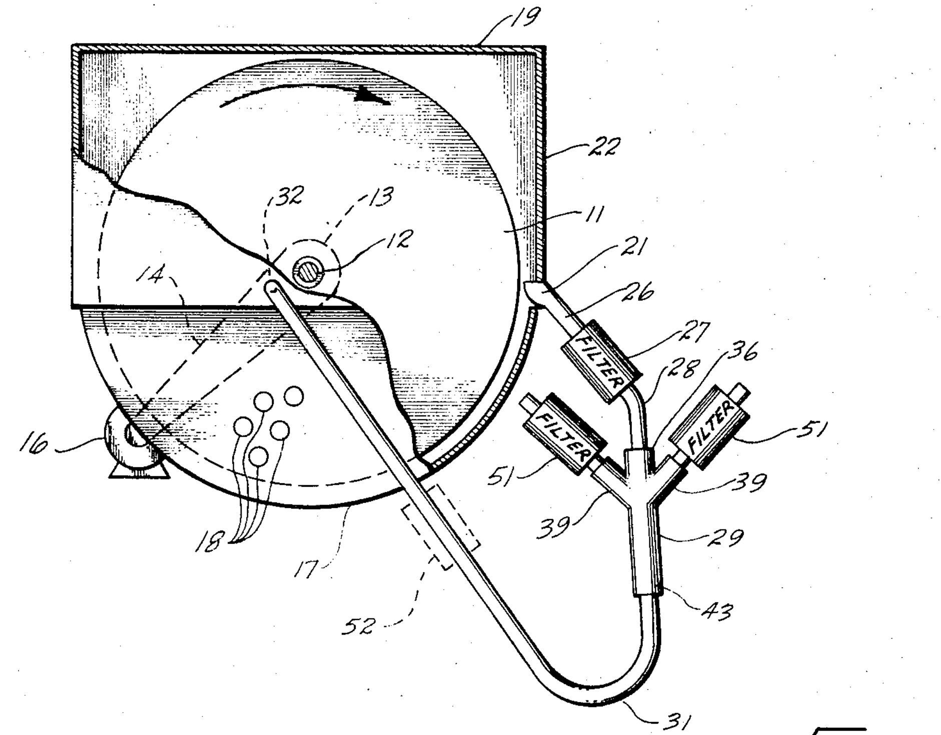
FIG. 1 illustrates semi-schematically a magnetic memory disk system constructed according to principles of this invention.

FIG. 1 illustrates semi-schematically and in partial cutaway a magnetic memory disk system constructed according to principles of this invention. The magnetic memory disk system has a conventional rotatable disk 11 on the flat faces of which are deposited a thin magnetic memory layer (not shown) for recording magnetic signals representative of digital data or the like. The disk 11 is mounted on a shaft 12 supported by bearings (not shown) and connected to a pulley 13. The pulley is driven by a V-belt 14 connected to an electric motor 16.

The disk 11 is contained within a closed housing having a lower housing portion 17 generally circular to conform to the curvature of the disk and sufficiently rigid to hold conventional magnetic transducer assemblies 18 including recording heads (not shown) adjacent the faces of the disk. The upper portion 19 of the housing is a rectangular enclosure typically constructed of sheet metal. The upper and lower housing portions are bolted together so as to enclose the disk and prevent free interchange of gas within the housing with gas from without the housing. It should be noted that the joint between the housing portions, the seals around the shaft 12, the transducer assemblies 18, and other conventional apertures in the housing provide sources of possible leakage that may permit air to enter or leave the housing. When a slight positive pressure is maintained within the housing, a small amount of such leakage can well be tolerated, and such tolerance significantly reduces the cost of manufacturing a disk file. Leakage causes air to be lost from the housing when it is pressurized and if desired deliberate venting can be provided in addition to inherent leakage for assuring full flow of make-up air in some embodiments.

It should be noted that such a disk housing, disk drive and recording head arrangement is conventional and well known to those skilled in the art. It will also be apparent that a broad variety of electrical connections and the like may be employed in a practical disk file memory system; however, since these are conventional and not germane to practice of this invention, they are not further described or illustrated herein.

Figure 2:
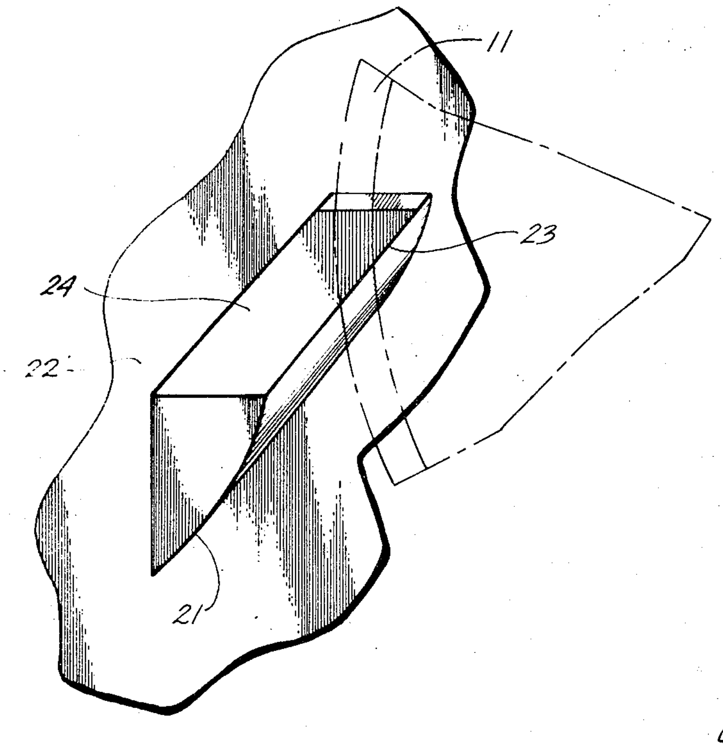
FIG. 2 illustrates in perspective an air scoop employed in the embodiment of FIG. 1.

FIG. 1 also illustrates schematically a pneumatic system for providing a positive pressure within the housing 17, 19, and for circulating air or some other pressurizing gas through a filter for removing particulate matter generated during the course of operation of the magnetic memory system. An air scoop 21 illustrated in greater detail in the perspective view of FIG. 2 extends through one wall of the upper housing portion 19 so as to have one edge 23 adjacent the rotatable disk 11. In a typical embodiment, the scoop has an opening 24 facing in the direction from which the disk rotates, extending from the end wall 22 of the housing portion 19 to within about 1/16 inch of the periphery of the disk. A width of such a typical scoop is about 11/16 inch and its length is about 2 inches.

With such a scoop arrangement, the very high velocity air in close proximity to the surface of the rotating disk enters the scoop along with a substantial volume of lower velocity air further from the disk. If the scoop opening were not as long a higher average velocity of air would be collected but the total volume of air entering the scoop would be reduced. Further, by having the scoop opening extend to the wall 22 of the housing, the air that tends to flow along the housing, as induced by the rotating disk, is freely collected by the scoop for extraction from the housing. Preferably, the edges of the scoop, particularly the edge 23 closest to the periphery of the disk, are beveled on the inside so as to provide a sharp edge having least interference with air entering the scoop.

Figure 3:
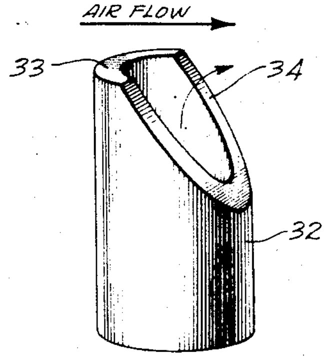
FIG. 3 illustrates a return air deflector from the embodiment of FIG. 1.

Referring again to FIG. 1, air picked up by the scoop 21 passes through a conduit 26 to a filter 27. The outlet of the filter is connected by way of a conduit 28 with the jet inlet of an ejector pump 29, described in greater detail hereinafter. Air exiting from the ejector pump 29 passes through a conduit 31 and is returned to the interior of the housing through a return fitting 32, an end of which is illustrated in FIG. 3. The end fitting 32 is merely a cylindrical rigid tube having an end flat portion 33 normal to the axis of the tube. Another flat portion 34 is diagonal to the axis of the tube at about 45° therefrom. When the end fitting 32 is installed in a disk file, the flat end face 33 is spaced about 1/16 to 1/8 inch from the face of the disk near its center where the pressure due to the pumping action of the disk is lowest. The flat end portion 33 is arranged "upstream" relative to the gas flow induced by rotation of the disk to serve as a deflector of such gas for minimizing interference with gas returning to the housing at the portion of the fitting cut away by the diagonal face 34. This also serves to create a lowered pressure region downstream of the deflector portion. The low pressure acts on the return line to further enhance the flow of gas through the filtering system. The decrease in pressure due to the deflector is dependent on the velocity of gas past it, therefore, if such a deflector is near the periphery of the disk the velocity is greater and a lower pressure may be obtained than with a simple return near the disk center without a deflector. Other deflector designs can be used, such as, for example, a flat sheet angled relative to the disk to converge therewith in the direction of rotation. Although preferred embodiments of scoop and return fitting have been described and illustrated herein, many other modifications and variations will be apparent to one skilled in the art. The disk rotating in the housing is, in effect, a very low efficiency centrifugal blower with air entering near the center and leaving near the periphery. In the self purging system this gas stream is recirculated from the exit to the return point through a filter. By way of example the scoop and return may be replaced by the self-purge systems disclosed in the above identified patent application entitled "Self-Purging Disk System."

In a preferred embodiment, the conduits 26, 28 and 31 are preferably formed of flexible vinyl tubing which permits ready interconnection with rigid components by conventional hose clamps or the like and which is not susceptible to shedding of particles during use. Many other substitute materials will be apparent, of course, and rigid conduits can be employed if desired. The relative lengths of the conduits can, of course, be selected for providing a convenient location for the ejector pump and filters.

Figure 4:
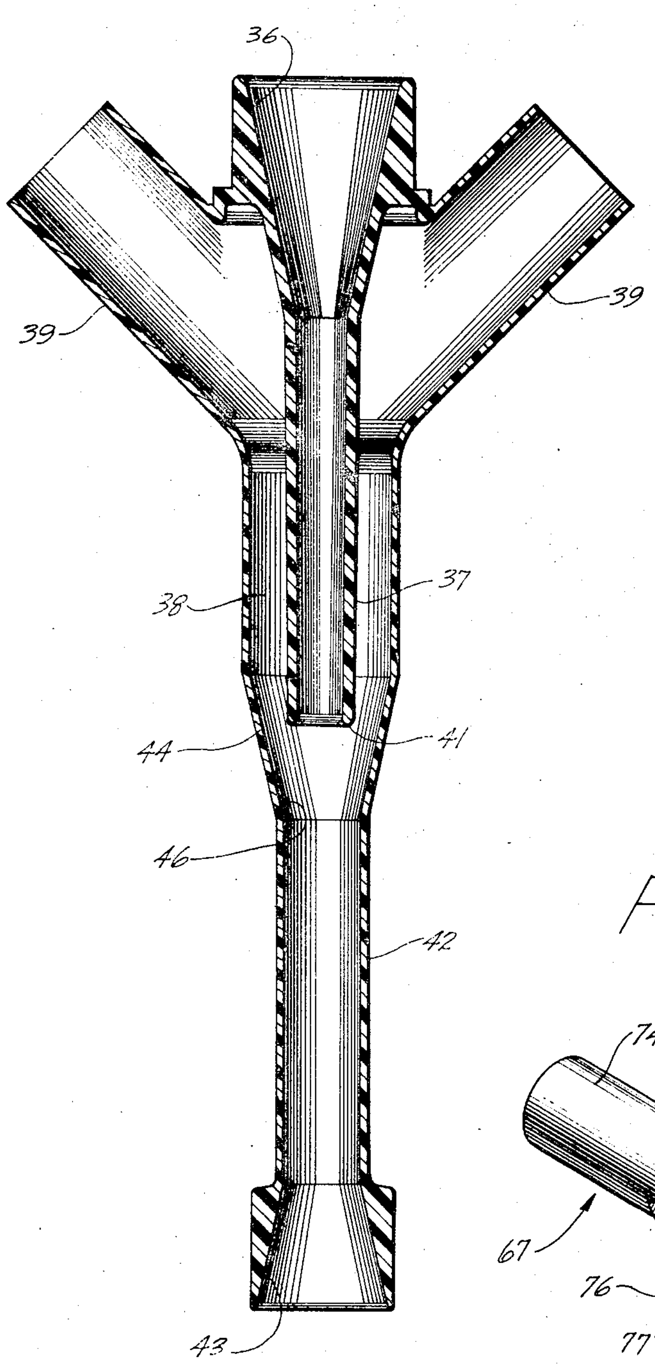
FIG. 4 illustrates in longitudinal cross section an ejector pump employed in practice of this invention according to a preferred embodiment.

The ejector pump 29 is seen in greater detail in longitudinal cross section in FIG. 4. As illustrated in this embodiment, the ejector pump has a converging inlet 36, the half angle of which is about 11° to 12.5°. The converging inlet 36 blends into an elongated tubular jet or nozzle 37, the opposite end of which extends into the hollow interior of the ejector pump. Surrounding a portion of the jet nozzle 37 is a cylindrical chamber or plenum 38. A pair of suction inlet arms 39 communicate with the chamber 38 in the general form of a Y. Typically, the arms 39 have an angle of about 45° or less from the axis of the ejector pump.

Aligned with and downstream from the tip 41 of the jet 37 is a cylindrical passage 42 having a cross-sectional area about three times the cross-sectional area of the inside of the jet nozzle 37. The passage 42 terminates in a diverging outlet port 43, the half angle of which is in the range of about 11° to 12.5°. A converging section 44 is provided between the cylindrical chamber 38 and the passage 42. The included half angle of the converging section 44 is in the range of about 11° to 12.5°. Further, a line drawn from the tip 41 to the intersection 46 between the convergent section 44 and the passage 42 has an angle of about 11° to 12.5° from the axis of the ejector pump. The jet inlet 36, suction inlets 3a and outlet 43 all have cylindrical exterior portions for receiving vinyl tubing held in place by hose clamps. Typically the pump and scoops are made of molded thermoplastic polycarbonate resin. High density polyethylene, polypropylene and other plastics may also be suitable.

Ejector pumps, which are sometimes known as eductors, exhausters or siphons are well known in the art and are widely used in liquid systems wherein one liquid is employed for pumping a liquid in a lower pressure. They are also known in gas systems wherein one gas is used to pump another gas. In still another variation, steam is sometimes used to pump water, and in such an arrangement, the pump is typically known as an injector. Generally speaking, a flow of fluid at a relatively higher pressure is passed through the jet inlet of the pump. As this fluid flows from the tip of the nozzle additional fluid from the region surrounding the nozzle is drawn into the stream and mixed therewith. The two fluids mix and at the exit of an ejector pump the pressure is intermediate between the pressure at the jet inlet and the pressure at the suction inlet.

Referring to the ejector pump 29 illustrated in FIG. 4, gas flowing through the converging jet inlet 36 accelerates in order to pass the same mass of gas through the smaller cross section of the nozzle 37 as through the conduit leading to the ejector pump. As the velocity increases, the dynamic or velocity pressure increases and the static pressure decreases since the sum of these, or the total pressure, remains substantially constant. Thus, at the tip 41 of the jet nozzle there is a sufficiently low static pressure to draw gas from the chamber 38 into the gas stream as it expands toward the passage 42. Suction of gas from the chamber or plenum 38 draws additional gas through the suction arms 39. In the short mixing section beyond the tip 41 of the nozzle, momentum is conserved and the velocity of gas from the nozzle decreases while the velocity of gas from the surrounding chamber 38 increases. Finally, after passing through the passage 42, which serves to minimize turbulence, the mixed gases expand through the diverging exit port 43 with further decrease in velocity. By this means, the velocity head or velocity energy of the gas entering the jet inlet of the ejector pump is converted to pressure head or pressure energy at the outlet of the pump.

The ejector pump preferred in practice of this invention should be particularly noted since it is a subsonic ejector, whereas most gas operated ejector pumps are sonic and have a standing shock at some point in the nozzle system. In such a sonic ejector, velocity of the gas may decrease as the cross-sectional area decreases so that the sonic and subsonic ejector pumps operate in exactly the opposite manner internally to effect a similar pressure boost externally. Since the preferred ejector pump is subsonic, the detailed design thereof is similar to design of an ejector pump for use with liquids. Generally speaking, the gas flowing through the pump can be considered as an incompressible fluid since the density increase is not greater than about 10 percent at any point in the pump. For this reason, the angles of convergence and divergence involved in the ejector pumps do not exceed about 12.5°, which is well suited for a subsonic ejector pump. If, on the other hand, an ejector pump were designed for sonic flow, angles in the order of 15° or greater would be involved. A subsonic ejector pump is preferred so that high pressures needed for a sonic ejector pump are not required.

Referring again to FIG. 1, the ejector pump 29 has its jet inlet 36 connected to the filter 27 and its outlet 43 connected to the return line 31 to the disk housing. Each of the suction inlet arms 39 is connected to a filter 51, the other end of which is open to the ambient environment. In operation, air collected from within the housing by the scoop 21 is filtered through the filter 27 and enters the jet inlet 36 of the ejector pump 29. The resultant suction draws ambient air through the filters 51 into the ejector pump where it is vectorially added to the gas flow from within the housing to be returned thereto.

It is found with such an arrangement employing an ejector pump for sucking in ambient air through filters that an internal pressure at the center line of the disk of at least 0.6 inch of water is obtained. Pressures noticeably higher than this are obtained near the periphery of the rotating disk. Although the positive pressure induced within the disk housing is not large, it is sufficient to prevent gas leakage into the housing. Thus, when the disk is rotating, air from within the housing circulates continuously so that any particulate matter generated due to operation of the disk is removed by the filter 27 and make-up air is drawn into the housing through the filters 51 which remove particles from the incoming air for providing a positive pressure in the housing.

In a typical embodiment the filters 27 and 51 are depth-type filters having a mat of fibers through which the air must pass in a tortuous path. Removal of particles and aerosols from the stream of air depends upon impingement of the air on the fibers in the filter and it is typically found that each such impingement removes about 60 percent of the particulate matter remaining from the previous impingement. Such filters typically provide several successive impingements before the air gets clear through the depth of fibers forming the filter medium. Thus, the depth-type filter removes a stated percentage, for example, 95 98 percent, of all particles that may impinge thereon. The depth-type filter is to some extent nonselective in that a percentage of all particle sizes is removed rather than all particles over some selected limit.

Another type of filter particularly useful in rotating disk magnetic memory systems is what is known as a membrane filter which is typically made of fabric or other material having uniform size perforations or of paper or the like having various size perforations with all below some selected minimum size. With such a membrane filter, all particles having a size larger than the orifices in the filter medium will be stopped so that no large particles can enter a system. These are sometimes classed as absolute filters.

Both the depth-type and membrane-type filters have advantages and drawbacks. The depth-type filter is velocity sensitive in that it requires a certain minimum velocity of gas therethrough in order to obtain effective impingement of the particles on the fibers forming the filter. If the velocity is not sufficiently high, particles may "drift" through the filter and the filtration efficiency is thereby reduced. A substantial volume of gas flow is needed to obtain sufficient velocity for effective filtering in a depth-type filter. The depth-type filter is advantageous, however, in that the pressure drop across the filter is relatively small. In the membrane filter on the other hand, the pressure drop is relatively higher; however, here is no opportunity for particles to drift through the filter and absolute filtration of all particles over a selected size is readily obtained.

It is preferred in the arrangement illustrated in FIG. 1 to provide all three filters 27 and 51 of the depth type so that low pressure drop occurs. It will be apparent that the filter 27 can be arranged downstream from the exit port 43 of the ejector pump 29 if desired; however, the volume of gas that must pass through the filter in that position is significantly greater than the volume that passes therethrough on the upstream side of the ejector. A possible variation, however, deletes the depth-type filter 27 from the purging loop and instead substitutes a membrane filter 52 downstream of the ejector pump, as seen in phantom in FIG. 1. With such an arrangement, all of the incoming air through the suction arms 39 is filtered through depth-type filters 51 to remove a significant percentage of all particles impinging thereon. All of the air, both the fresh air for pressurization and the purged air recirculated from the housing is passed through the membrane filter 52 so that all particles over a given size are effectively removed. By arranging the membrane filter down stream from the ejector pump a sufficiently high pressure drop can be tolerated to make the membrane filter practical. Many other modifications and variations of the filter arrangement in a combined positive pressure and self-purging system will be apparent to one skilled in the art.

Figure 5:
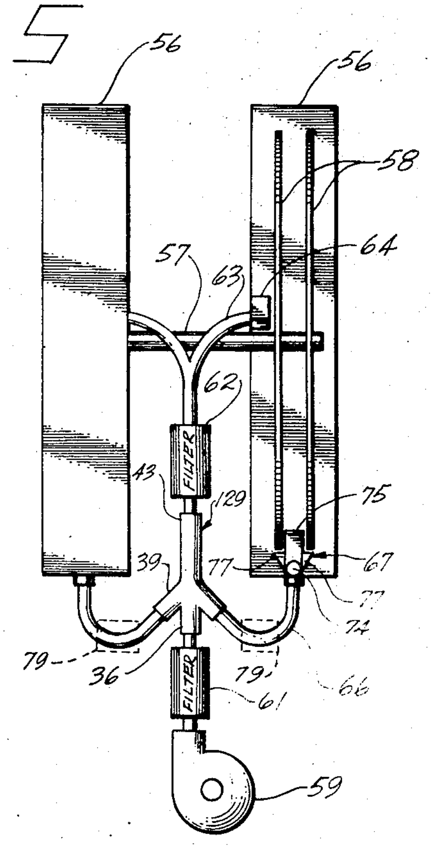
FIG. 5 illustrates semi-schematically another embodiment of disk file memory system having combined positive pressurization and self-purging according to principles of this invention.

FIG. 5 illustrates another embodiment of integrated positive pressure and self-purging system for a magnetic memory disk file, or the like. FIG. 5 is a semi-schematic front or top view having a pair of similar memory disk housings 56 side by side. A common shaft 57 extends between the two housings and has two memory disks 58 mounted thereon in each of the housings. The drive pulley for the shaft, supporting bearings, and other miscellaneous structures are deleted from FIG. 5 since not needed for an understanding of this embodiment. A conventional centrifugal blower 59 supplies air under pressure to a depth-type filter 61, the outlet of which is connected to the jet inlet 36 of a subsonic ejector pump 129. The outlet 43 of the ejector pump is connected to a membrane filter 62, and the outlet of the membrane filter is connected by way of a Y-conduit or the like into each of the housings 56. The conduit 63 leading from the membrane filter 62 to the housing 56 terminates in a deflector device 64 of any convenient design for decreasing pressure and thereby increasing flow of the air entering the housing by the rotating disks 58. As mentioned above, a deflector with gas return orifice downstream thereof creates a low pressure region for enhancing air flow. Each of the two suction arms 39 of the ejector pump is connected by a conduit 66 to a pickup scoop 67 in each of the housings 56. One of the pickup scoops 67 is illustrated in perspective in FIG. 6.

Figure 6:
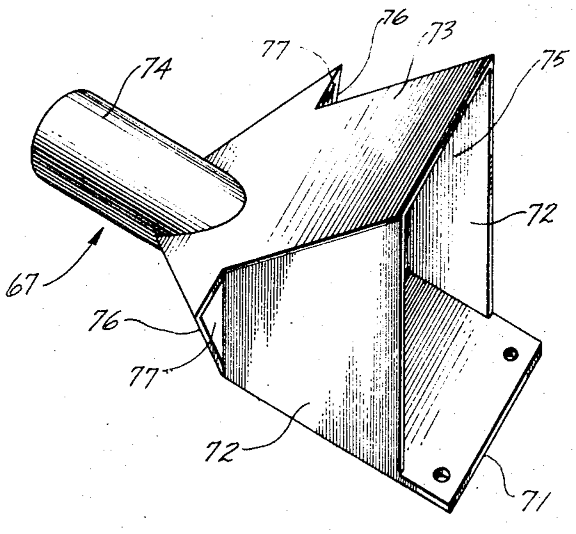
FIG. 6 illustrates in perspective a pick-up scoop for extracting air from the housing illustrated in FIG. 5.

As illustrated in FIG. 6, the pickup scoop has a base 71, which is conveniently bolted to the housing 56. Upstanding from the base are sidewalls 72 parallel to each other and extending along a portion of the length of the scoop. A face 73 connected to the walls 72 defines a rectangular opening 75 at one end of the scoop and converges towards the base 71 until a transition is made to a cylindrical section 74 at the opposite end of the scoop from the rectangular opening 75. A pair of wings 76 extend laterally from the center line of the scoop so that the face 73 has the general shape of an arrow pointing toward the cylindrical section 74. The wings 76 cooperate with the flat face 73 and the walls 72 to define a pair of triangular openings 77 on each side of the center line of the scoop.

Referring again to FIG. 5, the rectangular opening 75 of the scoop fits between a pair of disks 58 in the housing 56 when the scoop is bolted in position on the edge of the housing. The wing openings 77 are adjacent the periphery of the disk and extend outwardly beyond the outer face of each of the disks a small amount so that high velocity air near the surface of the disk is picked up in the wing openings 77 and a larger volume of air including high velocity air near the inner faces of the disk is picked up through the larger rectangular opening 75. All of this air picked up by the scoop 67 passes through the cylindrical portion 74 and thence to a tube fitting (not shown) connected to the conduit 66. This arrangement provides a high efficiency recovery of air from the rotating disks 58 and also assures that most particles from the outer faces of the disks also travel into the filtering circuit for removal. The more air one can cause to flow in the recirculating air stream, the more particulate material will be removed.

The embodiment illustrated in FIG. 5 provides for self purging of the disk housings 56 when the disks 58 are rotating or when the blower 59 is operating, or both. Pressurization is also obtained when the blower 59 is operating. Stated in another way, when the blower is operating, both positive pressure and self purging of the housing are obtained whether or not the disks are rotating.

In a first mode of operation when only the blower 59 is operating, air passes through the depth-type filter 61 and into the jet port 36 of the ejector pump 29. This sucks air from within the housing 56 through the conduit 66 and these two air streams are vectorially added and passed through the membrane filter 62 before returning to the housing 56. Air is sucked from the housing 56 and returned thereto whether or not the disks 58 are rotating due solely to the jet action of the ejector pump. If the disks 58 are rotating, additional air is collected by the scoop 67 so that the total volume of air passing through the filter 62 is somewhat larger than when the disks are stopped. Leakage from the housing 56 is normally sufficient for enough make-up air to flow and operate the ejector pump. If the inherent leakage from the housings 56 is not sufficient for enough make-up air to flow and operate the ejector pump properly, a deliberate bleed of air from the system may be provided.

If, on the other hand, the disks 58 are rotating and the blower 59 is not operating, air is still picked up by the high efficiency scoop 67 and passed through the ejector pump 129 and returned to the housing 56 in the same general manner as a self-purging disk file without a supplementary pressurization system integrated therewith. Flow of air through the suction ports of the ejector pump does not draw any substantial volume of air through the jet port, so that in this arrangement when the blower is not operating pressurization may not be obtained at all points within the housing; however, a continual self-purge exists.

A variation in the embodiment of FIG. 5 is also possible by providing filters 79 in the flow conduits 66 between the scoops 67 and the suction inlets of the ejector pump as seen in phantom in FIG. 5. With such modification the filter 62 downstream of the ejector pump may be deleted. It should also be apparent that an arrangement as provided in FIG. 1 can be used for two housings with circulating air from both housings going to the jet inlet and make-up air being sucked through filters.

The arrangement illustrated in FIG. 5 is advantageous since it is possible to continue purging of the housing for the disks when for some reason the disks are not operating or before the disks are put into service. This provides for cleaning up of the environment within the housing before the disks are operated for further minimizing any possibilities of damage due to stray particulate contaminants within the housings. Previously purging of disk file housings has been done prior to operation by connection to an external purging system. Clean air circulated through the housing removes much stray contamination. This is a problem though since it has been necessary to disconnect the external purge system and when it is opened there is always the possibility of adding particles that may interfere with disk operation. Further, the combining of the circulating and make-up air streams in this embodiment permits use of a membrane filter in the purging stream since there is sufficient pressure available in the combined air streams.

Although but two embodiments of combined positive pressurization and purging system for magnetic memory disk files have been described and illustrated herein, many modifications and variations will be apparent to one skilled in the art. Thus, for example, a single suction port on an ejector pump may be used, either by redesign of the pump or merely by plugging one suction inlet on the pump illustrated herein. The pickup scoops in the illustrated arrangements happen to be located where the disk is turning down, but any point around the periphery can be used and it is only significant that the scoop opening face counter to the direction of disk rotation. The return ports are conveniently near the disk center since pressure is usually lowest there, however if the housing has other low pressure regions, the gas return can just as well be there. Many other variations will be apparent and it is therefore to be understood that within the scope of the appended claims the invention may be practiced otherwise than as specifically described.

What is claimed is:

1. A combination for pressurizing and cleaning gas in a housing comprising:
a rotatable member in the housing;
means for rotating the rotatable member;
means for extracting a portion of gas from the housing relatively nearer the periphery of the rotatable member;
means for returning a portion of gas to the housing; and
a filter and an ejector pump connected serially between the means for extracting and the means for returning for vectorially adding gas flow from within the housing and gas flow from without the housing and filtering both gas flows for enhancing the flow of filtered gas to the means for returning.

2. A combination for pressurizing and cleaning gas in a housing comprising:
a rotatable member in the housing;
means for rotating the rotatable member;
means for extracting a portion of gas from the housing relatively nearer the periphery of the rotatable member;
means for returning a portion of gas to the housing;
an ejector pump having a jet inlet for pumping connected to the means for extracting, a suction inlet in fluid communication with the ambient air, and an outlet connected to the means for returning for vectorially adding gas flow from within the housing and gas flow from without the housing for enhancing the flow of gas to the means for returning; and
a filter connected serially with the ejector pump between the means for extracting and the means for returning.

3. A combination as defined in claim 2 wherein the ejector pump operates with subsonic flow of the gas therethrough.

4. A combination as defined in claim 2 further comprising a second filter having an inlet open to the ambient air and an outlet connected to the suction inlet.

5. A combination as defined in claim 4 wherein:
the first mentioned filter is connected between the means for extracting and the jet inlet; the rotatable member comprises a magnetic memory disk; and the means for extracting comprises a scoop adjacent the periphery of the disk and having an opening facing counter to the direction of rotation of the disk.

6. A combination as defined in claim 5 wherein the means for returning a portion of gas comprises:

a flow deflector adjacent a portion of the rotatable disk; and a gas return orifice adjacent the flow deflector in the direction of disk rotation.

7. A combination as defined in claim 1 further comprising:

means for supplying gas under pressure; and wherein the ejector pump has a jet inlet for pumping, a suction inlet, and an outlet;

the jet inlet is connected to the means for supplying gas; and the suction inlet is connected to the means for extracting.

8. A combination as defined in claim 7 wherein the ejector pump operates with subsonic flow of the gas therethrough.

9. A combination as defined in claim 8 further comprising a second filter between the means for supplying gas and the jet inlet; and wherein the rotatable member comprises a magnetic memory disk; and the means for extracting comprises a scoop adjacent the periphery of the disk and having an opening facing counter to the direction of rotation of the disk.

10. A combination as defined in claim 9 wherein the means for returning a portion of gas comprises:

a flow deflector adjacent a portion of the disk; and a gas return orifice adjacent the flow deflector in the direction of disk rotation.

11. A combination as defined in claim 1 wherein the rotatable member comprises a pair of spaced apart magnetic memory disks rotatable together; and the means for extracting comprises a scoop having a central opening between the pair of disks and a pair of side openings, one adjacent the periphery of each disk and extending therebeyond, the openings all facing counter to the direction of rotation of the disks.

12. A method for maintaining a clean atmosphere and a positive pressure in a chamber subject to leakage and to particle generation within the chamber comprising the concurrent steps of:

forming a circulating gas stream from a first region of the chamber to a second region of the chamber;

forming a make-up gas stream from outside the chamber into the second region of the chamber;

passing both gas streams through a subsonic ejector pump having a jet inlet, a suction inlet and a common outlet so that one gas stream induces flow in the other gas stream and the gas streams are mixed between the pump outlet and the second region of the chamber; and filtering both gas streams.

13. A method as defined in claim 12 wherein at least one of the gas streams is filtered upstream from the ejector pump.

14. A method for maintaining a clean atmosphere and a positive pressure in a chamber subject to leakage and to particle generation within the chamber comprising the concurrent steps of:

rotating a member within the chamber for creating a relatively higher pressure in a first region of the chamber and a relatively lower pressure in a second region of the chamber; and wherein the step of passing comprises:

forming a circulating gas stream from the first region of the chamber to the second region;

forming a make-up gas stream from outside the chamber into the second region of the chamber;

passing the circulating gas stream through the jet inlet of a subsonic ejector pump passing the make-up gas stream through the suction inlet of the subsonic ejector pump, whereby the circulating gas stream induces flow in the make-up gas stream;

passing the combined circulating gas stream and the make-up gas stream from the outlet of the ejector pump to the second region of the chamber; and filtering both gas streams.

15. A method as defined in claim 12 wherein the step of forming the make-up gas stream comprises supplying gas under pressure; and the passing step comprises:

passing the make-up gas stream through the jet inlet; and passing the circulating gas stream through the suction inlet, whereby the make-up gas stream induces flow in the circulating gas stream.

16. A combination for pressurizing and cleaning gas in a housing comprising:

means for supplying gas to the housing under pressure;

means for filtering the gas before entering the housing; and an ejector pump having a jet inlet connected to the means for supplying, a suction inlet connected to the housing, and an outlet connected to the housing.

17. A combination as defined in claim 16 wherein the ejector pump is subsonic.

18. A combination as defined in claim 16 further comprising:

a rotatable magnetic memory disk in the housing;

means connected to the ejector pump suction inlet for extracting gas from a relatively higher pressure area in the housing adjacent the disk; and means connected to the ejector pump outlet for returning gas to a relatively lower pressure area in the housing, whereby gas circulates through the ejector pump when the disk is rotating whether or not the means for supplying gas is operating.

19. A self-cleaning magnetic recording disk file comprising:

a disk file housing;

a magnetic recording disk mounted in the housing;

means for rotating the disk;

a gas outlet scoop for extracting gas from the housing adjacent the periphery of the disk;

a gas inlet into the housing;

means for supplying gas under pressure;

a subsonic ejector pump having a jet inlet connected to the means for supplying gas, a suction inlet connected to the outlet scoop, and an outlet connected to the gas inlet; and means connected serially with the ejector pump for filtering the gas supplied and the gas extracted from the housing.

20. A disk file as defined in claim 19 further comprising:

a second disk file housing;

a second magnetic recording disk mounted in the second housing;

means for rotating the second disk;

a gas outlet scoop for extracting gas from the second housing adjacent the periphery of the second disk; and a gas inlet into the second housing;

a second suction inlet in the ejector pump connected to the outlet scoop of the second disk file housing; and wherein the means for filtering comprises:

a first filter connected between the means for supplying gas and the jet inlet; and a filter for removing all particles over a selected size connected between the ejector pump outlet and the gas inlets to the first and second housings.

21. A self-cleaning magnetic recording disk file comprising:

a disk file housing;

a magnetic recording disk mounted in the housing;

means for rotating the disk;

a gas outlet scoop for extracting gas from the housing adjacent the periphery of the disk;

a gas inlet into the housing;

a subsonic ejector pump having a jet inlet connected to the gas outlet scoop, a suction inlet in fluid communication with the ambient air, and an outlet connected to the gas inlet; and means connected serially with the ejector pump for filtering gas before reaching the gas inlet.

22. A disk file as defined in claim 21 wherein the means for filtering comprises:

a first filter having an outlet connected to the suction inlet and an inlet open to the ambient air;

a second filter serially connected with the ejector pump in the gas stream between the outlet scoop and the gas inlet to the housing.

* * * * *